United States Patent
Valavi et al.

(10) Patent No.: US 7,180,908 B2
(45) Date of Patent: Feb. 20, 2007

(54) SWITCH WITH TANDEM PORTS AND OUTLET ASSEMBLY

(75) Inventors: Anand Valavi, Sunnyvale, CA (US); Thomas Kuehnel, Fremont, CA (US); Donald M. Gray, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1028 days.

(21) Appl. No.: 10/247,076

(22) Filed: Sep. 19, 2002

(65) Prior Publication Data

US 2004/0066790 A1    Apr. 8, 2004

(51) Int. Cl.
*H04J 3/16*    (2006.01)
*H04L 12/50*   (2006.01)
(52) U.S. Cl. ........................ 370/465; 370/388
(58) Field of Classification Search ............ None
See application file for complete search history.

(56) References Cited

U.S. PATENT DOCUMENTS 6,545,483 B1 *  4/2003  Douglas ............... 324/525
6,876,654 B1 *  4/2005  Hegde ................. 370/392
6,895,443 B2    5/2005  Aiken

OTHER PUBLICATIONS

Web Site 1394 Trade Association Home Page available at http://www.1394ta.org/ [accessed May 28, 2005].
Web Site IEEE Standards Association Home Page available at http://standards.ieee.org/getieee802/ [accessed May 28, 2005].
Broadband Reports.com, www.broadbandreports.com, pp. 1-3 (1999-2000).
ORiNOCO™ Active Ethernet Solutions. Power over Ethernet for the Wireless LAN, Agere Systems Inc., pp. 1-2 (2001).

* cited by examiner

*Primary Examiner*—Chi Pham
*Assistant Examiner*—Ronald Abelson
(74) *Attorney, Agent, or Firm*—Marshall, Gerstein & Borun LLP

(57) ABSTRACT

A switch with tandem ports and an outlet assembly permit individual segments of cable to be used with multiple data link protocol standards. The multiple data link protocols can be used either one at a time, with each group of wires in the cable carrying the same data link protocol in different communication sessions, or can be used in tandem, with each group of wires in the cable simultaneously carrying a different data link protocol.

33 Claims, 8 Drawing Sheets

SWITCH WITH TANDEM PORTS AND OUTLET ASSEMBLY

TECHNICAL FIELD OF THE INVENTION

The invention relates generally to network communication at the data link layer and, more particularly, to the handling of multiple data link protocols over a single physical cable.

BACKGROUND

Currently there are several approaches to deployment of networks in the home. Some approaches follow the "no new wires" paradigm and attempt to use existing wires such as phone lines, power lines, or cable television lines to connect devices. Other approaches assume that, as compelling applications and services arrive, new homes will come with the appropriate wires, and that such wires will also be deployed in existing homes. It is currently projected that CAT5 cables will be deployed in a large number of new homes as they are constructed, and that CAT5 will also be the wiring of choice in retrofitting existing homes.

Typically, CAT5 wiring with standardized RJ45 connectors is set up in homes in a star topology, where wires from each wall outlet are drawn to a central hub in a wiring closet. Ethernet, and 100BaseT Ethernet in particular, is the most popular data link protocol being used over CAT5 wiring. Another networking standard, known as IEEE 1394, has seen a recent increase in popularity, especially for use in multimedia distribution. A newer version of the IEEE 1394 standard, called IEEE 1394b, includes CAT5 as a transport medium. Both IEEE 1394b and 100BaseT Ethernet have their advantages and disadvantages. A preference for one over the other is usually based on an implicit assumption as to whether data networking or multimedia distribution will be the driving force behind deployment of home networks. It is unlikely that the dust will settle on debate over IEEE 1394b versus 100BaseT Ethernet for CAT5 in the near future.

SUMMARY

A switch with tandem ports and an outlet assembly are provided herein. According to an embodiment of the invention, the switch has multiple ports and two or more switching units. Each port is capable of handling two or more data link protocols simultaneously. Each switching unit handles a different data link protocol. When a cable is connected to a given port, data signals pass through different groups of wires of the cable and into the port. The switch determines the data link protocol being used on each group of wires. The switch chooses which switching unit is to receive and, ultimately, redirect the data signals to their proper destination based on the data link protocol being used.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

FIG. 5b is a close-up view of a representative port of the outlet assemblies of FIG. 5a.

DETAILED DESCRIPTION

Figure 1:
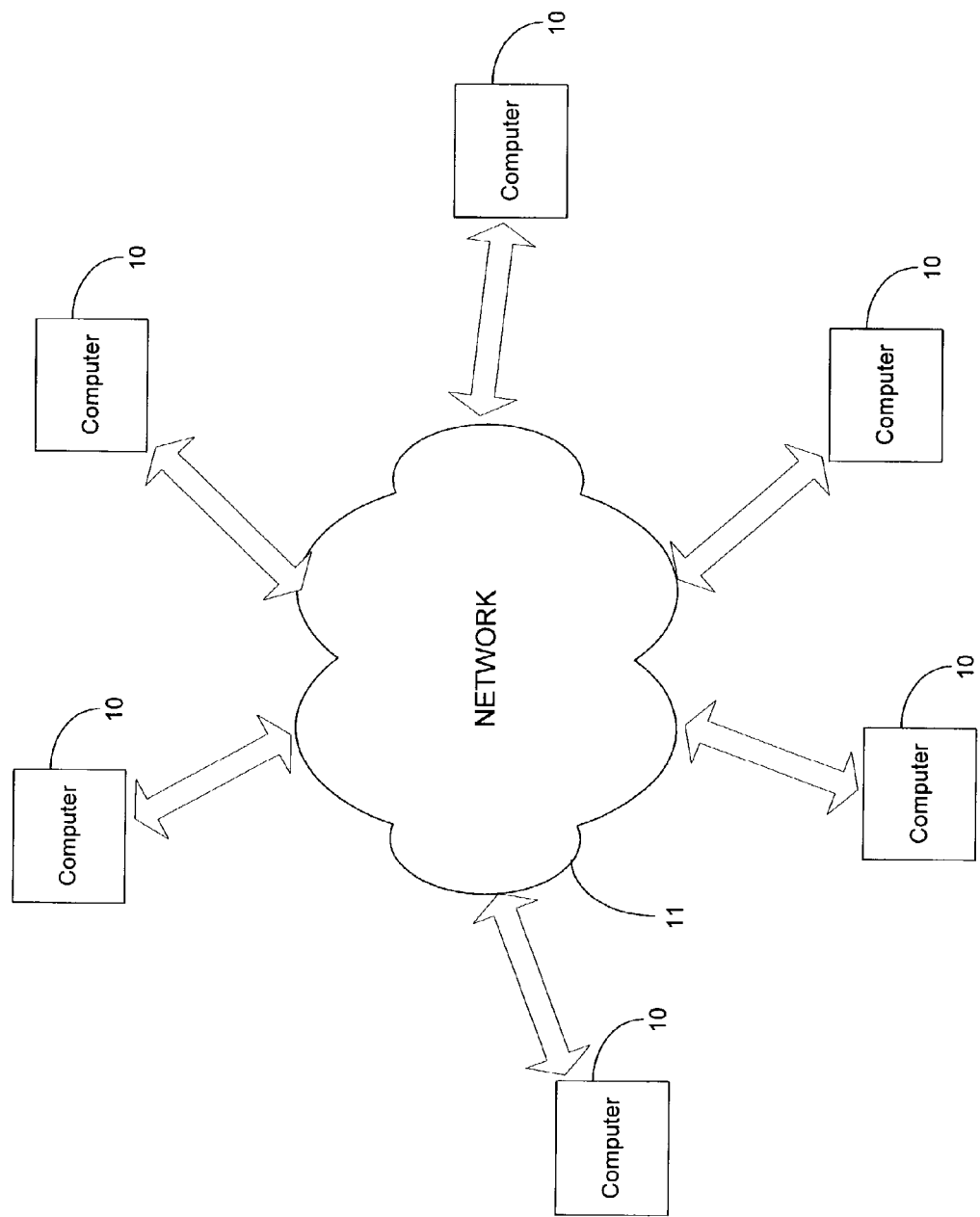
FIG. 1 illustrates an example of a computer network in which the invention may be practiced.

The invention is generally directed to a switch and an outlet assembly that permit individual segments of cable to be used with multiple data link protocol standards. The multiple data link protocols can be used either one at a time, with each group of wires in the cable carrying the same data link protocol in different communication sessions, or can be used in tandem, with each group of wires in the cable simultaneously carrying a different data link protocol. According to various embodiments of the invention, the switch has multiple ports for multiple cables, and automatically detects which data link protocol or protocols are being received via the cable in each port. Upon detecting which data link protocol or protocols are being used in data signals received in a given port, the switch redirects the data signals to one or more switching units. For example, at a given port, if one group of wires of the cable at that port is carrying 100BaseT Ethernet data signals and another group of wires of the cable at that port is carrying IEEE 1394 data signals, the switch redirects the Ethernet data signals to a switching unit that is configured to read Ethernet signals, and redirects the IEEE 1394 data signals to a switching unit that is configured to read IEEE 1394 signals.

Various embodiments of the invention permit, for example, an individual segment of CAT5 cable to be used dynamically as a 100BaseT Ethernet link, a 1000BaseT Ethernet link, or an IEEE 1394 link. Furthermore, various embodiments of the invention allow full utilization of all eight wires of a CAT5 cable. For example, in one embodiment of the invention, a single CAT5 cable can support two 100BaseT segments, two IEEE 1394 segments or one 100BaseT segment and one IEEE 1394 segment. According to various embodiments of the invention, switches are made "idiot proof," in that any device (100BaseT, IEEE 1394, 1000BaseT) can be plugged in, and will work.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert, The term "computer" as used herein includes any device that electronically executes one or more programs, such as personal computers (PCs), hand-held devices, multiprocessor systems, microprocessor-based programmable consumer electronics, network PCs, minicomputers, mainframe computers, consumer appliances having a microprocessor or microcontroller, routers, gateways, hubs and the like. The term "switch" as used herein includes any "computer" as previously defined that is capable of performing switching functions.

The invention may also be employed in distributed computing environments, where tasks are performed by remote processing devices that are linked through a communications network. In a distributed computing environment, programs may be located in both local and remote memory storage devices.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 2:
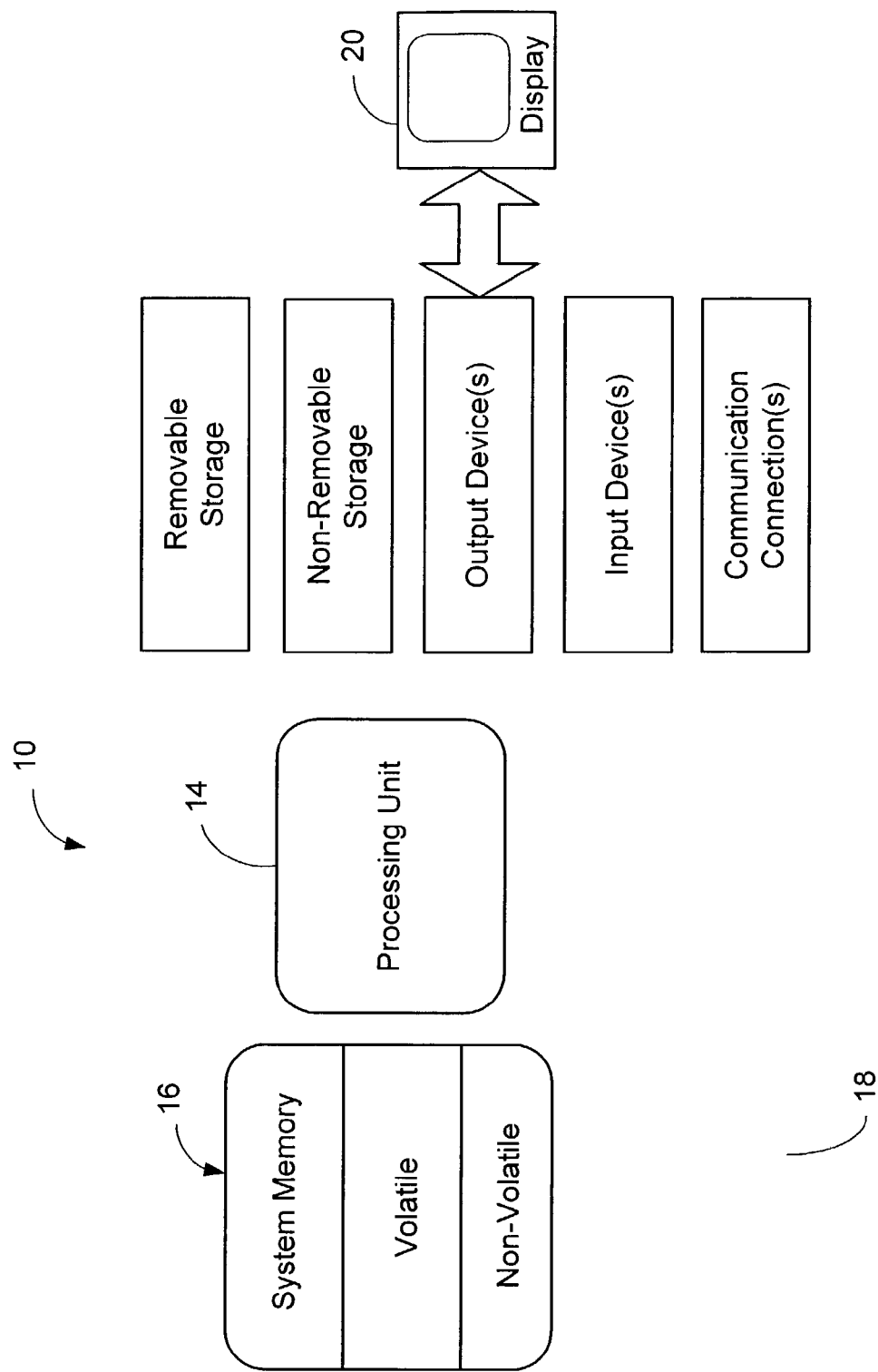
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

Figure 3:
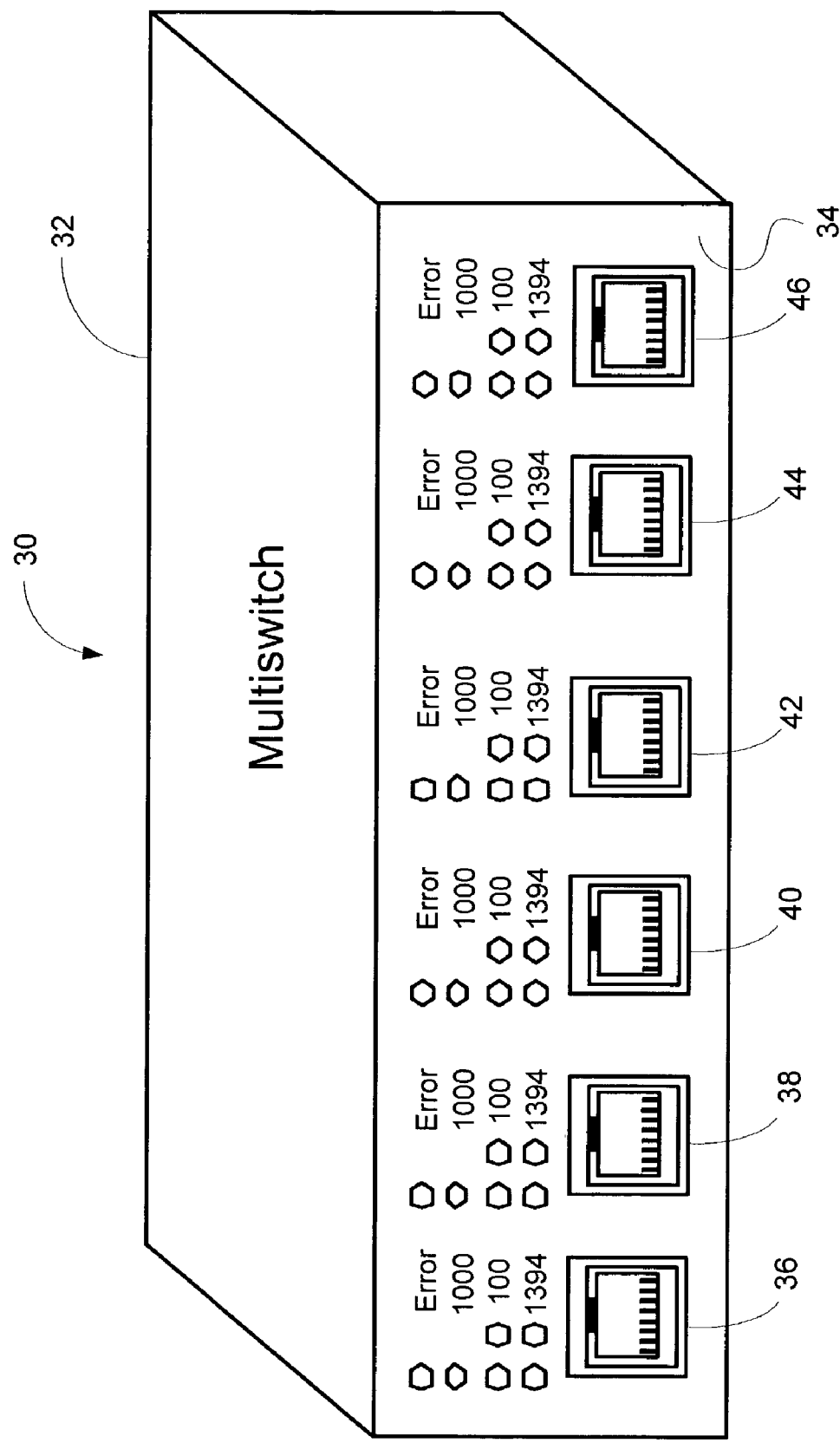
FIG. 3 illustrates an embodiment of the invention.

Turning again to the invention, reference is made to FIG. 3, in which an embodiment of the invention, in the form of a multiswitch 30, is shown. The multiswitch 30 has a casing 32 having a front panel 34. The front panel 34 has six ports 36 through 46. Each port is configured to accept an RJ45 connector of a CAT5 cable, and has eight conductors that make electrical contact with the corresponding eight contacts of the RJ45 connector. The eight conductors include two groups of four conductors each. In a given communication session that uses a port of the multiswitch 30, all eight conductors of the port may be active, as when 1000BaseT Ethernet is being used. Alternatively, one of the groups of four conductors may be active, as when 100BaseT Ethernet or IEEE 1394 is being used. Finally, both groups of four conductors may be active simultaneously in two separate communication sessions, with both groups carrying the same data link protocol (100BaseT Ethernet or IEEE 1394) or with each group of four conductors carrying different data link protocols (one carrying 100BaseT Ethernet and the other carrying IEEE 1394). On the front panel 34, adjacent to each port, is a set of light-emitting diode indicators that indicate whether the CAT5 cable connected to that port is carrying 1000BaseT Ethernet data signals, two sets of 100BaseT Ethernet data signals, two sets of IEEE 1394 data signals, one set each of 100BaseT Ethernet and IEEE 1394 signals, or a single set of either 100BaseT Ethernet signals or IEEE 1394 signals.

During operation, the multiswitch 30 senses which of the ports 36 through 46 is receiving signals from a connector inserted into it. For those ports in which the multiswitch 30 senses the presence of an active connection, the multiswitch 30 identifies what data link protocol or protocols are being used.

In the embodiment depicted in FIG. 3, the multiswitch 30 detects whether a port is receiving: (1) 1000BaseT Ethernet data signals over all of the conductors of the port, (2) 100BaseT Ethernet signals over one or both of the groups of four conductors of the port, or (3) IEEE 1394 data signals over one or both of the groups of four conductors. For each case, the multiswitch 30 creates internal connections so as to direct the data signals to an internal switching unit that handles the data link protocol being used. The switching unit then directs the data signals to another of the ports 36 through 46 as specified by the hardware address included in the data signals, or as specified by a look-up table.

There are a variety of ways in which the multiswitch 30 can detect which protocol is being received at each port. The method used by the multiswitch 30 to identify data link protocols may be passive. In one embodiment, for example, the multiswitch 30 monitors the signal levels at each port. The method may also be active. For example, in another embodiment of the invention, the multiswitch 30 drives signals over the cable that is attached to a particular port, and monitors the response. The multiswitch 30 then identifies the data link protocol used based on the response. Other methods may also be used. For example, according to the IEEE 802.3 set of standards, the Selector Field value in the Link Code Word is used to permit the multiswitch 30 to identify the protocol that it supports. Currently there are bits defined to advertise types of 10BaseT, 100BaseT and 1000BaseT implementations. Additionally, the Selector Field code space has sufficient space to reserve values for other protocols.

One approach that may generally be used to distinguish between IEEE 1394 and different types of 10/100/100BaseT implementations is to assign a currently unused value in the code space of the Selector Field to represent the IEEE 1394 standard. This allows auto detection between the IEEE 1394b and other standards that support auto negotiation. This approach is advantageous in that it is simple. Additionally, this technique can scale to incorporate other types of standards. However, this approach may require enhancements to currently existing IEEE 1394 standards.

An alternative approach that does not necessarily require changes to the currently existing IEEE 1394 standards is as follows: (1) At one the ports 36–46, the multiswitch 30 uses auto negotiation as currently defined in the IEEE 802.3 standards to determine if the plugged in network is Ethernet, and, if so, the type of Ethernet. (2) If the multiswitch 30 receives no auto negotiation signals, the multiswitch 30 assumes that the connected device is an IEEE 1394 device. To validate this assumption, the multiswitch 30 passively monitors the cable connected to the port for IEEE 1394 signals. If IEEE 1394 signals are detected, the assumption is validated. (3) If passively monitoring the cable does not conclusively determine if the device is an IEEE 1394 device, the multiswitch 30 actively initiates an IEEE 1394 bus reset and monitors the cable for a response. If the expected sequence following an IEEE 1394 bus reset is received, the multiswitch 30 identifies the connected bus to be an IEEE 1394 bus. If the expected sequence is not received, the multiswitch 30 concludes that an unknown (unsupported) type of bus has been plugged in.

The embodiment of FIG. 3 permits the creation of two distinct, independent networks—an Ethernet-based network and an IEEE 1394-based network. In certain embodiments, the configuration (the cross-connect functionality) of the multiswitch 30 is static and can be changed only by plugging or unplugging the various cables that are attached to the ports 36–46.

Figure 4A:
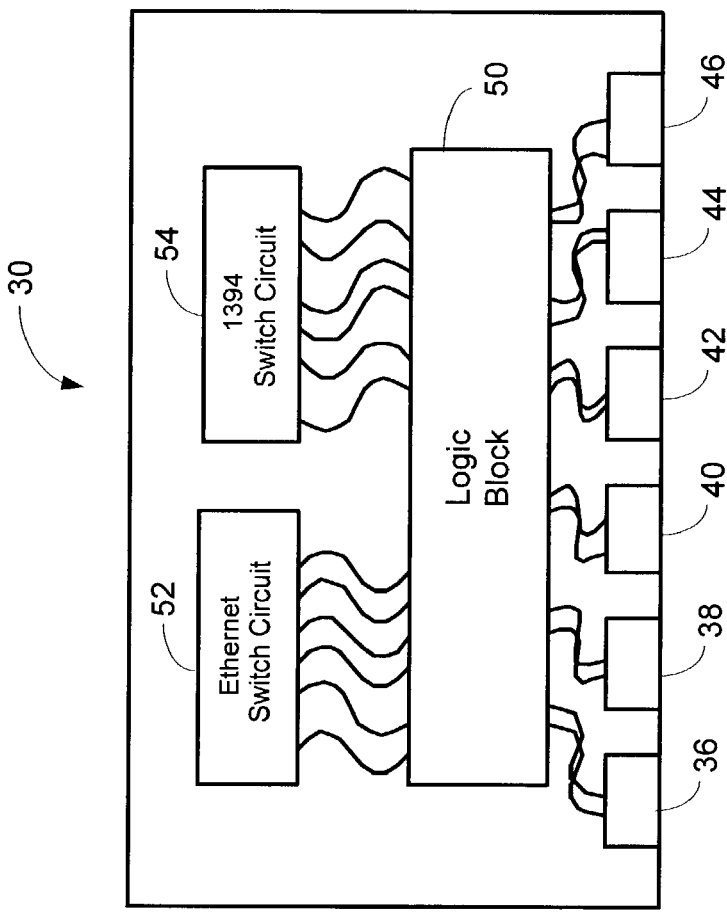
FIG. 4a illustrates a logical diagram of an embodiment of the invention.

Referring to FIG. 4a, a logical diagram of the internal structure of the multiswitch 30 is shown. The internal structure includes a logic block 50, an Ethernet switch circuit 52 and a 1394 switch circuit 54. The ports 36–46 are electrically connected to the logic block 50, while the logic block 50 is electrically connected to each of the Ethernet and 1394 switch circuits 52 and 54. The Ethernet switch circuit 52 provides an interface for Ethernet data signals—1000BaseT or 100BaseT—and switches the signals to other ports as needed. The 1394 switch circuit 54 performs the same functions as the Ethernet switch circuit, but does so for IEEE 1394 data signals. The logic block 50 performs the functions of detecting the data link protocol being used by the data signals received at one or more of the ports 36 through 46 and directing the data signals to either the Ethernet switch circuit 52 or the 1394 switch circuit 54 as appropriate.

Figure 4B:
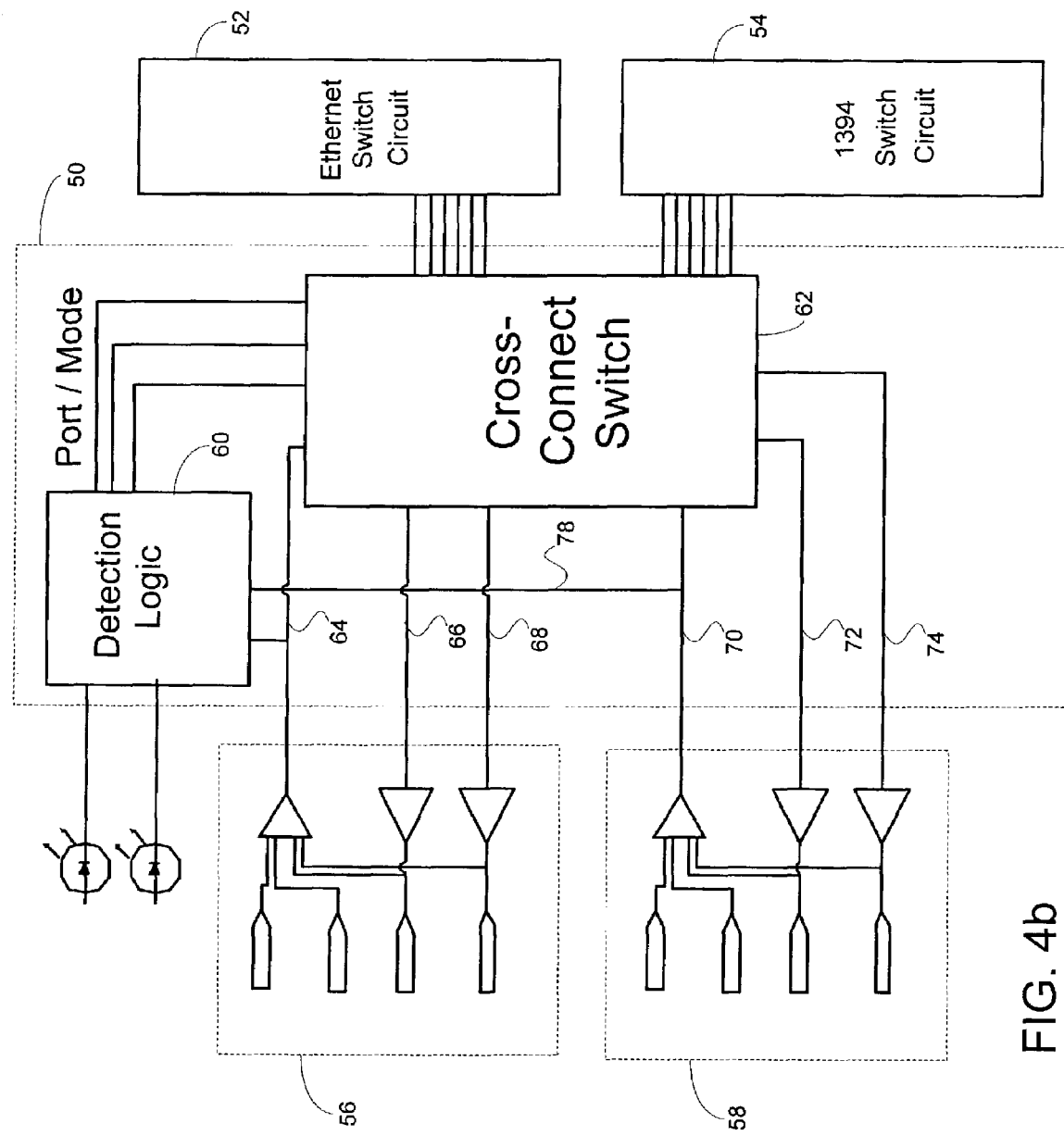
FIG. 4b illustrates a more detailed logical diagram of an embodiment of the invention.

Referring to FIG. 4b, a partial example of how the port 36 and the logic block 50 of FIG. 4a may be implemented is shown. The port 36 includes first and second physical interfaces 56 and 58, which are electrically connected to the port 36 of the multiswitch 30 (FIG. 4a). Each physical interface corresponds to four of the eight conductors of the port 36. The physical interfaces for ports 38–46 are not shown in FIG. 4b, but may also be implemented using the first and second physical interfaces 56 and 58. The logic block 50 includes a detection logic circuit 60 and a cross-connect switch 62. The first physical interface 56 is electrically connected to the cross-connect switch 62 via lines 64, 66 and 68, while the second physical interface 58 is electrically connected to the cross-connect switch 62 via lines 70, 72 and 74. The detection logic circuit 60 is connected to the line 64 of the first physical interface 56 via a line 76, and is connected to the line 70 of the second physical interface 58 via a line 78. The cross-connect switch 62 is electrically connected to the detection logic circuit 60, the Ethernet switch 52 and the 1394 switch 54.

As data signals enter either or both of the physical interfaces 56 and 58, the detection logic circuit 60 determines the data link protocol being used by the data signals and sends control signals to the cross connect switch 62 to activate one or more logic gates in the cross connect switch 62. In response, the cross connect switch 62 diverts the data signals to either the Ethernet switch circuit 52 or the IEEE 1394 switch circuit 54, or both. The Ethernet switch circuit 52 and the IEEE 1394 switch circuit 54, upon receiving the diverted signals, determine their proper destination and, by transmitting the appropriate control signals to the cross connect switch 62, activate the appropriate logic gates in the cross connect switch 62, thereby redirecting the data signals to the appropriate port or ports 36 through 46 of the multiswitch 30.

Figure 5A:
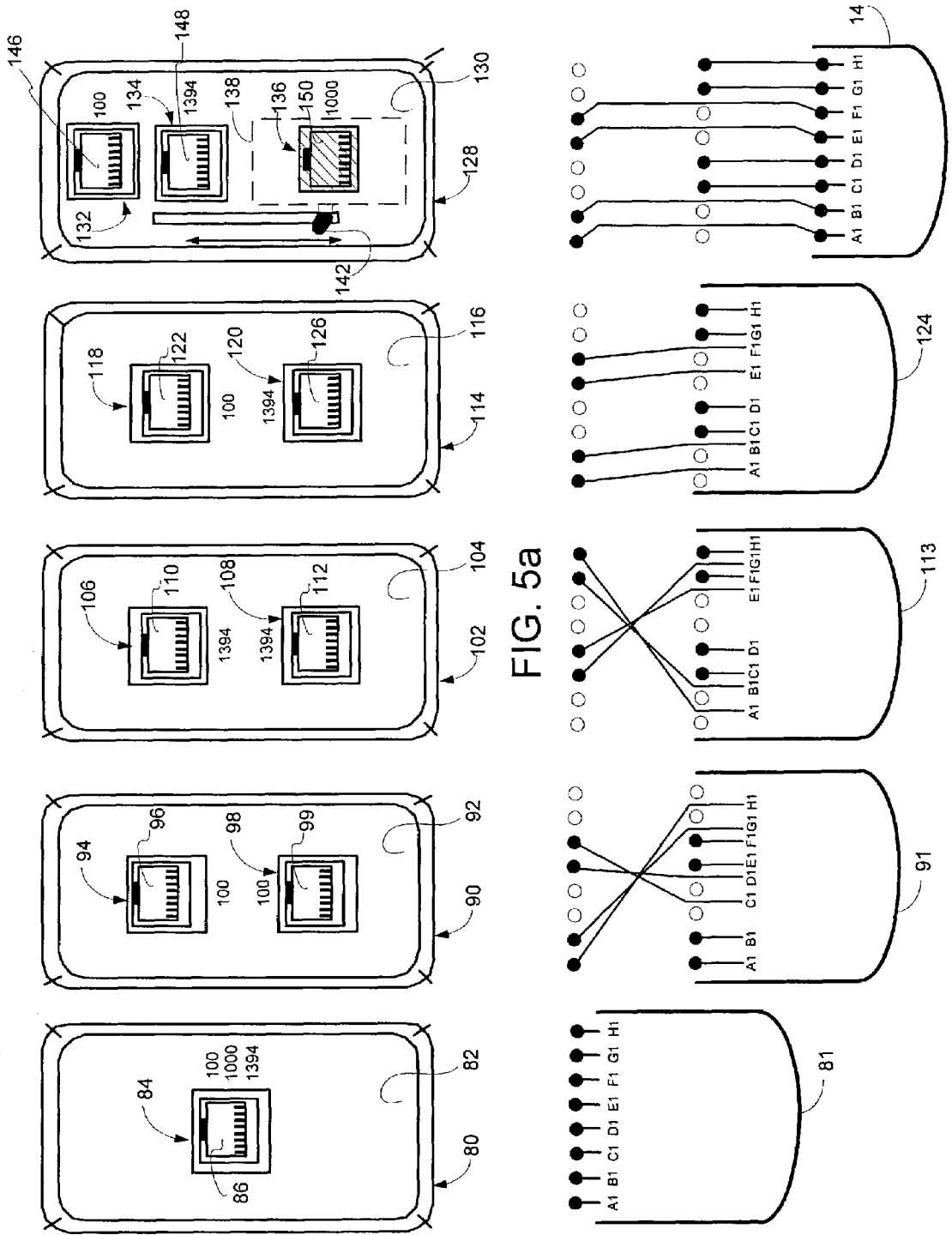
FIG. 5a illustrates several outlet assemblies configured according to various embodiments of the invention.
Figure 5B:
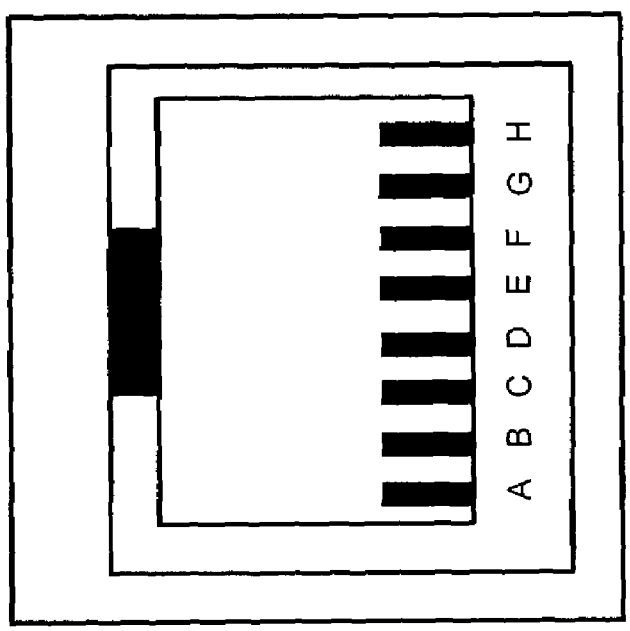

According to various embodiments of the invention, an outlet assembly for handling multiple data link protocols is also provided, several embodiments of which are shown in FIG. 5a. A single-port, multiple protocol outlet assembly 80 includes a plate 82, which has a port 84 that is capable of accommodating an RJ45 connector. The port 84 has an opening 86 that faces away from the plate 82. FIG. 5b shows a close-up of port that is representative of all of the physical ports referred to herein. Like the port of FIG. 5b, the port 84 includes eight conductors A through H. The eight conductors A through H are electrically connected to eight wires A1 through H1 of a CAT5 cable 81 at connection points that are represented as black circles. The CAT5 cable 81 is disposed behind the plate 82. The assembly 80 is intended to accommodate either the 100BaseT Ethernet protocol, the IEEE 1394 protocol or the 1000BaseT Ethernet protocol.

A double-port, single protocol outlet assembly 90 includes a plate 92, which has a first port 94 and a second port 98, each of which is capable of accommodating an RJ45 connector. The first port 94 has an opening 96 that faces away from the plate 92. The first port 94 includes eight conductors A through H, like those shown in FIG. 5b. Four of the conductors—conductors A, B, E and F are electrically connected to four wires of a CAT5 cable 91—wires H1, G1, D1 and C1 respectively at connection points that are represented by black circles. The CAT5 cable 91 is disposed behind the plate 92. The second port 98 has an opening 99 that faces away from the plate 92, and includes eight conductors A through H, like the ones shown in FIG. 5b. Four of the conductors—conductors A, B, E and F are electrically connected to the other four wires of the CAT5 cable 91—wires A1, B1, E1 and F1 respectively at connection points that are represented by black circles. The assembly 90 is intended to accommodate two cables for carrying the 100BaseT Ethernet protocol—one cable in each of the two ports.

Another version of the double-port, single protocol outlet assembly 90 has reference numeral 102 and includes a plate 104, which has a first port 106 and a second port 108, each of which is capable of accommodating an RJ45 connector of a CAT5 cable. The first port 106 has an opening 110 that faces away from the plate 104. The first port 106 includes eight conductors A through H, like those shown in FIG. 5b.

Four of the conductors—conductors C, D, G and H are electrically connected to four wires of a CAT5 cable 113—wires G1, E1, B1 and A1 respectively at connection points that are represented by black circles. The CAT5 cable 113 is disposed behind the plate 104. The second port 108 has an opening 112 that faces away from the plate 104, and includes eight conductors A through H, like those shown in FIG. 5b. Four of the conductors—conductors C, D, G and H are electrically connected to the other four wires of the CAT5 cable—wires C1, D1, F1 and H1 respectively at connection points that are represented by black circles. The assembly 102 is intended to accommodate two cables for carrying the IEEE 1394 protocol—one cable in each of the two ports.

A double-port, multiple-protocol outlet assembly 114 includes a plate 116, which has a first port 118 and a second port 120, each of which is capable of accommodating an RJ45 connector of a CAT5 cable. The first port 118 has an opening 122 that faces away from the plate 116. The first port 118 includes eight conductors A through H, like those shown in FIG. 5b. Four of the conductors—conductors A, B, E and F are electrically connected to four wires of a CAT5 cable 124—wires A1, B1, E1 and F1 respectively at connection points that are represented by black circles. The CAT5 cable 124 is disposed behind the plate 116. The second port 120 has an opening 126 that faces away from the plate 116 and includes eight conductors A through H, like those shown in FIG. 5b. Four of the conductors—conductors C, D, G and H are electrically connected to the other four wires of the CAT5 cable 124—wires C1, D1, G1 and H1 respectively at connection points that are represented by black circles. The assembly 114 is intended to accommodate one cable in the first port 118 for carrying the 100BaseT Ethernet protocol, and one cable in the second port 120 for carrying the IEEE 1394 protocol.

A multi-port, selectable outlet assembly 128 includes a plate 130, which has a first port 132, a second port 134 and a third port 136 that are each capable of accommodating an RJ45 connector of a CAT5. The assembly 128 also includes a generally flat and generally rectangular selector 138 disposed under the plate 130. The selector 138 has an arm 142 that protrudes from a slot 144 in the plate 130. The selector 138 has two positions—a first position in which it blocks the third port 136 (as shown in FIG. 5a), and a second position in which it blocks the first port 132 and the second port 134. Each of the first port 132, the second port 134 and the third port 136 has an opening, having reference numerals 146, 148 and 150 respectively, that faces away from the plate 130. The first port 132, second port 134 and third port 136 each includes eight conductors A through H, like those shown in FIG. 5b. Four of the conductors of the first port 132—conductors A, B, E and F are electrically connected to four of the conductors of the third port 134, conductors A, B, E, and F respectively. Four of the conductors of the second port 134—conductors C, D, G and H are electrically connected to four of the conductors of the third port 136—conductors C, D, G, and H respectively. The eight conductors A through H of the third port 136 are electrically connected to eight wires A1 through H1 respectively of a CAT5 cable 140 at connection points that are represented by black circles. The CAT5 cable 140 is disposed behind the plate 130. When the selector 138 is in the first position, the assembly 128 accommodates one cable in the first port 132 for carrying the 100BaseT Ethernet protocol, and one cable in the second port 134 for carrying the IEEE 1394 protocol. When the selector 138 is in the second position, the assembly 128 accommodates a single cable for carrying the 1000BaseT Ethernet protocol in the third port 136.

Figure 6:
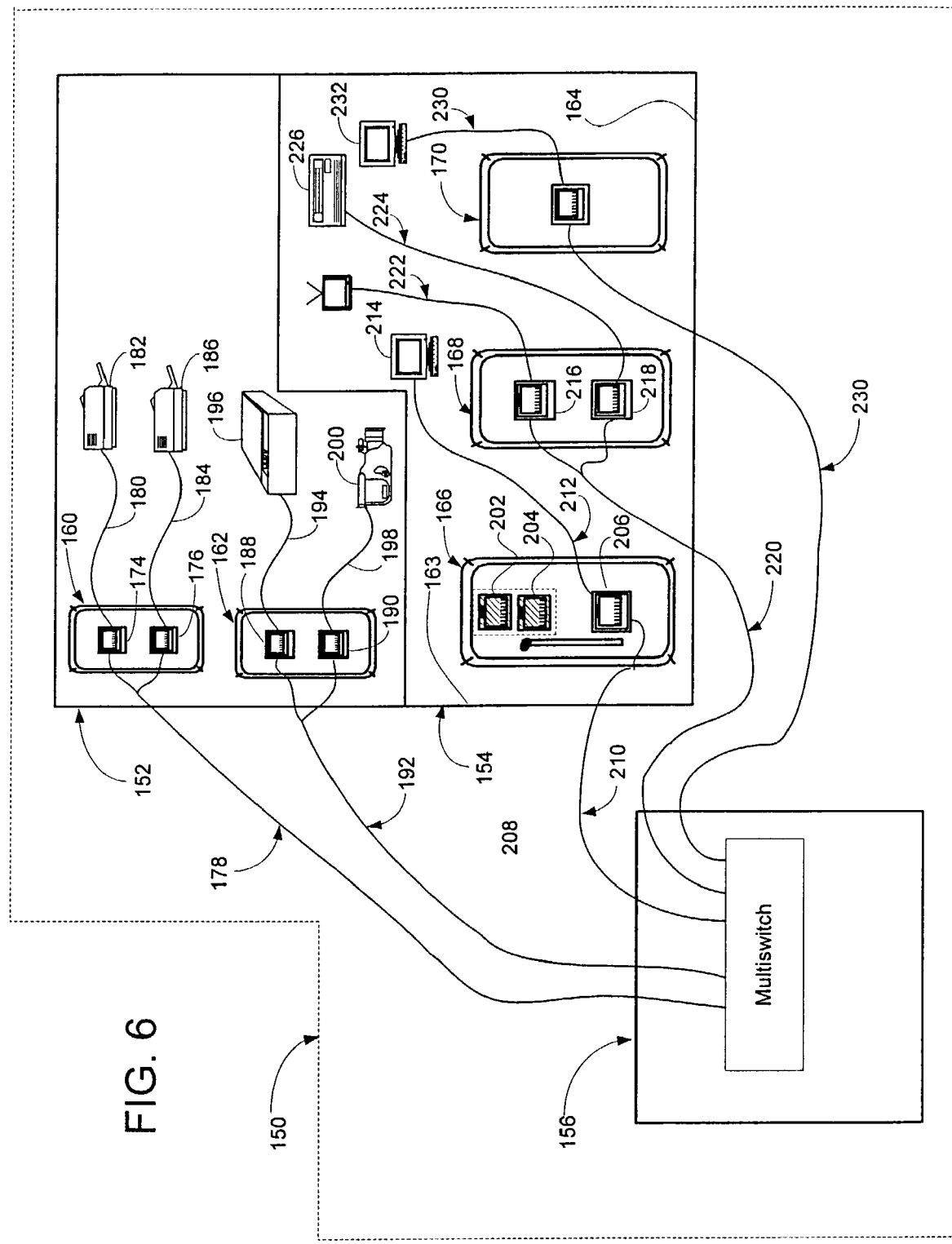
FIG. 6 illustrates a home network in accordance with an embodiment of the invention.

An example of a scenario in which an embodiment of the invention is used will now be described with reference to FIG. 6. In this example, a house 150 includes a first room 152, a second room 154, and a third room 156. Mounted on a wall surface 158 of the first room 152 are a first outlet assembly 160 and a second outlet assembly 162. Mounted on a first wall surface 163 of the second room 154 is a third outlet assembly 166. Finally, mounted on a second wall surface 164 of the second room 154 is a fourth outlet assembly 168 and a fifth outlet assembly 170. Located in the third room 156 is a multiswitch 172 configured according to an embodiment of the invention.

The first outlet assembly 160 has a first port 174 and a second port 176. Both the first port 174 and the second port 176 are configured to receive an RJ45 connector for a CAT5 cable that carries data signals formatted according to the 100BaseT Ethernet data link protocol. The first port 174 of the first outlet assembly 160 has eight conductors, four of which are active. The four active conductors of the first port 174 are electrically connected to a first group of four wires of a first CAT5 cable 178 that runs behind the wall 158 of the first room 152 and is attached to the a port of the multiswitch 172. The second port 176 of the first outlet assembly 160 also has eight conductors, four of which are active. The four active conductors of the second port 176 are electrically connected to a second group of four wires of the first CAT5 cable 178. Connected to the opening of the first port 174 of the first outlet assembly 160 is an RJ45 connector at the end of a second CAT5 cable 180, the other end of which is connected to a first printer 182. Connected to the second port 176 of the first outlet assembly 160 is an RJ45 connector at the end of a third CAT5 cable 184, the other end of which is connected to a second printer 186.

The second outlet assembly 162 has a first port 188 and a second port 190. Both the first port 188 and the second port 190 of the second outlet assembly 162 are configured to receive an RJ45 connector for a CAT5 cable. The first port 188 of the second outlet assembly 162 is further configured to receive data signals formatted according to the 100BaseT Ethernet data link protocol. In contrast, the second port 190 of the second outlet assembly 162 is further configured to receive data signals formatted according to the IEEE 1394 standard. The first port 188 of the second outlet assembly 162 has eight conductors, four of which are active. The four active conductors of the first port 188 are electrically connected to a first group of four wires of a first CAT5 cable 192 that runs behind the wall 158 of the first room 152 and terminates in a port of the multiswitch 172. The second port 190 of the second outlet assembly 162 also has eight conductors, four of which are active. The four active conductors of the second port 190 are electrically connected to a second group of four wires of the first CAT5 cable 192. Connected to the first port 188 of the second outlet assembly 162 is an RJ45 connector at the end of a second CAT5 cable 194, the other end of which is connected to a scanner 196. Connected to the second port 190 of the second outlet assembly 162 is an RJ45 connector at the end of a second CAT5 cable 198, the other end of which is connected to a video camera 200.

The third outlet assembly 166 has a first port 202, a second port 204, a third port 206, and a selector 208 for selecting either the first and second ports 202 and 204 in tandem or the third port by itself. In this example, it is assumed that the selector is positioned so as to block the first and second ports 202 and 204, while leaving the third port 206 open. The first port 202, the second port 204 and the third port 206 of the third outlet assembly 166 are each configured to receive an RJ45 connector for a CAT5 cable. The first port 202 of the third outlet assembly 166 is intended to receive data signals formatted according to the 100BaseT Ethernet data link protocol. In contrast, the second port 202 of the third outlet assembly 166 is intended to receive data signals formatted according to the IEEE 1394 data link protocol. Finally, the third port 206 of the third outlet assembly 166 is intended to receive data signals formatted according to the 100BaseT Ethernet data link protocol. The third port 206 of the third outlet assembly has eight conductors, all of which are active. The eight conductors of the third port 206 are electrically connected to the eight wires of a first CAT5 cable 210 that that runs behind the first wall 163 of the second room 154 and terminates in a port of the multiswitch 172. The first port 202 of the third outlet assembly 166 has eight conductors, four of which are active. The four active conductors of the first port 202 are electrically connected to four of the eight conductors of the third port 206. The second port 204 of the third outlet assembly 166 also has eight conductors, four of which are active. The four active conductors of the second port 204 are electrically connected to a the remaining four of the eight conductors of the third port 206. Attached to the opening of the third port 206 of the third outlet assembly 166 is an RJ45 connector at an end of a second CATS cable 212, the other end of which is connected to a computer 214.

The fourth outlet assembly 168 has a first port 216 and a second port 218. The first port 216 and the second port 218 are each configured to receive an RJ45 connector for a CAT5 cable that carries data signals formatted according to the IEEE 1394 data link protocol. The first port 216 of the fourth outlet assembly 168 has eight conductors, four of which are active. The four active conductors of the first port 216 are electrically connected to a first group of four wires of a first CAT5 cable 220 that runs behind the second wall 164 of the second room 154 and terminates in a port of the multiswitch 172. The second port 218 of the fourth outlet assembly 168 also has eight conductors, four of which are active. The four active conductors of the second port 218 are electrically connected to a second group of four wires of the first CAT5 cable 220. Connected to the opening of the first port 216 of the fourth outlet assembly 168 is an RJ45 connector at an end of a second CAT5 cable 222, the other end of which is connected to a television 215. Connected to the second port 218 of the fourth outlet assembly 168 is an end of a CAT5 cable 224, the other end of which is connected to an optical disk drive 226.

The fifth outlet assembly 170 has a single port 228. The port 228 is configured to receive an RJ45 connector for a CAT5 cable that carries data signals formatted according to any one of the 100BaseT, IEEE 1394 or 1000BaseT data link protocols. The port 228 of the fifth outlet assembly 170 has eight conductors, all of which are active. The eight conductors of the port 228 are electrically connected to the eight wires of a first CAT5 cable 230 that that runs behind the wall 164 of the second room 154 and terminates in a port of the multiswitch 172. Connected to the port 228 of the fifth outlet assembly 170 is an RJ45 connector of an end of a second CAT5 cable 230, the other end of which is connected to personal computer 232. In this example, the personal computer 232 communicates over the second CAT5 cable 230 using both the 100BaseT Ethernet protocol and the IEEE 1394 protocol.

Referring again to FIG. 6, the first and second printers 182 and 186, the scanner 196, the video camera 200, the first and second personal computers 214 and 232, the television 215 and the optical disk drive 226 are all connected to the multiswitch 172 by CAT5 cables in a star topology that includes two logical networks. The first and second printers 182 and 186, the scanner 196, and the first and second personal computers 214 and 232 are all part of an Ethernet network, while the video camera 200, the television 215, the second personal computer 232 and the optical disk drive 226 are all part of an IEEE 1394 network. In the illustrated embodiment, the Ethernet and IEEE 1394 networks are bridged together at the Internet Protocol (IP) layer by the second personal computer 232, which may include both an Ethernet adapter and an IEEE 1394 adapter. According to other embodiments of the invention, the two networks are bridged together at the IP layer by intelligent logic located in the multiswitch 172. As is known in the art, bridging from one protocol to another involves receiving data in the first protocol from the source network, encapsulating the data into the second protocol, and sending the encapsulated data to the target network. A bridge also maps address and routing information from the format of the source network to the format of the second network.

It can thus be seen that a new and useful switch with tandem ports and a new and useful outlet assembly have been provided. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A switch comprising:
   a plurality of ports, wherein at least one port of the plurality of ports comprises a first group of conductors and a second group of conductors;
   a first switching unit for switching data signals of a first data protocol to one or more of the plurality of ports;
   a second switching unit for switching data signals of a second data protocol to one or more of the plurality of ports; and
   one or more logic elements for performing steps comprising:
      determining the protocol of data signals received on the first group of conductors,
      determining the protocol of data signals received on the second group of conductors,
      directing the data signals received on the first group of conductors to either the first switching unit or the second switching unit based on the determined protocol of the data signals received on the first group of conductors, and
      directing the data signals received on the second group of conductors to either the first switching unit or second switching unit based on the determined protocol of the data signals received on the first group of conductors.

2. The switch of claim 1, further comprising:
   a cable comprising a first group of wires and a second group of wires; and
   a connector coupled to an end of the cable, the connector comprising a first group of conductors in electrical contact with the first group of wires and with the first group of conductors of the port, and a second group of conductors in electrical contact with the second group of wires and with the second group of conductors of the port, wherein the connector secures the end of the cable to the port.

3. The switch of claim 1, further comprising:

a cable comprising a first group of wires in electrical contact with the first group of conductors of the port, and a second group of wires in electrical contact with the second group of conductors of the port, wherein the first group of wires carries data signals formatted according to the first data protocol and the second group of wires carries data signals formatted according to the second data protocol.

4. The switch of claim 1, further comprising:

a cable comprising a first group of wires in electrical contact with the first group of conductors of the port, and a second group of wires in electrical contact with the second group of conductors of the port, wherein the first group of wires carries data signals of a first communication session, and the second group of wires carries data signals of a second communication session, and wherein the data signals for the first communication session and the data signals for the second communication session are formatted according to the same data protocol and are directed to the same switching unit by the one or more logic elements.

5. The switch of claim 1, wherein the first data protocol is Ethernet and the second data protocol is IEEE 1394.

6. The switch of claim 1, further comprising a panel having a plurality of indicators for indicating, for each of the plurality of ports, which data protocol is being passed through the first and second group of conductors of the port.

7. On a switch linking two or more segments of a computer network, the switch comprising a physical port coupled to a cable, the cable comprising a first group of conductors and a second group of conductors, the switch further comprising a plurality of protocol-specific switching units, a method for processing data signals transmitted over the cable, the method comprising:

receiving data signals over the first group of conductors, the data signals being formatted according to a data link protocol;

determining the data link protocol of the data signals received over the first group of conductors;

receiving data signals over the second group of conductors, the data signals being formatted according to a data link protocol;

determining the data link protocol of the data signals received over the second group of conductors;

directing the signals received over the first group of conductors to a protocol-specific switching unit of the plurality based on which data link protocol the data signals received over the first group of conductors are determined to be; and directing the signals received over the second group of conductors to a protocol-specific switching unit of the plurality based on which data link protocol the data signals received over the second group of conductors are determined to be.

8. A computer-readable medium having stored thereon computer executable instructions for performing the method of claim 7.

9. The method of claim 7, wherein the step of directing the data signals received over the first group of conductors comprises directing the data signals to a first protocol-specific switch that is capable of interpreting a first protocol; and wherein the step of directing the data signals received over the second group of conductors comprises directing the data signals to a second protocol-specific switch that is capable of interpreting a second protocol.

10. The method of claim 7, wherein the protocol-specific switching unit to which the data signals received over the second group of conductors are directed is the same as the protocol-specific switching unit to which the data signals received over the second group of conductors are directed.

11. The method of claim 7, wherein the protocol-specific switching unit to which the data signals received over the second group of conductors are directed is different than the protocol-specific switching unit to which the data signals received over the second group of conductors are directed.

12. The method of claim 7, wherein the step of determining the data link protocol of the data signals that are being received over the first group of conductors comprises passively sensing the data signals received over the first group of conductors, and wherein the step of determining the data link protocol of the data signals that are being received over the second group of conductors comprises passively sensing the data signals received over the second group of conductors.

13. The method of claim 7, wherein the port is a first port of a plurality of ports, the method further comprising:

determining the destination device for the data signals received over the first group of conductors;

redirecting the data signals received over the first group of conductors to a second port of the plurality of ports, the destination device for the data signals received over the first group of conductors being linked to the second port;

determining the destination device for the data signals received over the second group of conductors; and redirecting the data signals received over the second group of conductors to a third port of the plurality of ports, the destination device for the data signals received over the first group of conductors being linked to the third port.

14. The method of claim 7, wherein the port is a first port of a plurality of ports, the method further comprising:

extracting a first destination address from the data signals received over the first group of conductors;

redirecting the data signals received over the first group of conductors to a second port of the plurality of ports, the destination address for the data signals received over the first group of conductors corresponding to the second port;

extracting a first destination address from the data signals received over the second group of conductors; and redirecting the data signals received over the second group of conductors to a third port of the plurality of ports, the destination address for the data signals received over the first group of conductors corresponding to the third port.

15. The method of claim 7, wherein the port is a first port of a plurality of ports, the method further comprising:

referencing a look-up table to determine the appropriate destination port for the data signals received over the first group of conductors;

referencing a look-up table to determine the appropriate destination port for the data signals received over the second group of conductors; and based on the referencing steps, redirecting the data signals received over the first group of conductors and the data signals received over a the second group of conductors to a second port and to a third port, respectively, of the plurality of ports.

16. A method for processing multiple sets of data signals, the method comprising:

receiving a cable into a first physical port of a switch, the first physical port being one of a plurality of physical ports of the switch, the cable comprising a first group and a second group of conductors, the first group of conductors carrying data signals formatted according to a first data protocol, the second group of conductors carrying data signals formatted according to a second data protocol;

identifying the first data protocol;

directing the data signals carried by the first group of conductors to a first switching unit, the first switching unit being configured to interpret at least parts of the first data protocol;

identifying the second data protocol; and directing the data signals carried by the second group of conductors to a second switching unit, the second switching unit being configured to interpret at least parts of the second data protocol.

17. A computer-readable medium having stored thereon computer-executable instructions for performing the method of claim 16.

18. The method of claim 16, further comprising:

the first switching unit redirecting the data signals carried by the first group of conductors to a physical port of the plurality of physical ports other than first physical port; and the second switching unit redirecting the data signals carried by the second group of conductors to a physical port of the plurality of physical ports other than first physical port.

19. The method of claim 16, wherein the first data protocol is Ethernet and the second data protocol is IEEE 1394.

20. The method of claim 16, wherein the cable is a first cable, the method further comprising:

receiving a second cable in a second physical port of the plurality of physical ports;

the first switching unit redirecting the data signals carried by the first group of conductors to the second physical port such that a first group of wires of the second cable receives the data signals; and the second switching unit redirecting the data signals carried by the second group of conductors to the second physical port such that a second group of wires of the second cable receives the data signals.

21. The method of claim 16, wherein the cable is a first cable, the method further comprising:

receiving a second cable in a second physical port of the plurality of physical ports;

receiving a third cable in a third physical port of the plurality of physical ports the first switching unit redirecting the data signals carried by the first group of conductors to the second physical port such that the second cable receives the data signals; and the second switching unit redirecting the data signals carried by the second group of conductors to the third physical port such that the third cable receives the data signals.

22. An apparatus for securing cable connectors, the apparatus comprising:

a plate for mounting onto surface;

a first physical port disposed within the plate, the first physical port comprising a first set of conductors, the first physical port having an opening that faces away from the plate and that is capable of receiving a data connector;

a second physical port disposed within the plate, the second physical port comprising a second set of conductors, the second physical port having an opening that faces away from the plate and that is capable of receiving a data connector; and a cable disposed on the opposite side of the surface as the openings of the first and second physical ports, the cable comprising a first set of wires that are in electrical contact with the first set of conductors and a second set of wires that are in electrical contact with the second set of conductors.

23. The apparatus of claim 22, wherein the first and second set of conductors carries data signals formatted according to a first data link protocol; and wherein the second set of conductors carries data signals formatted according to a second data link protocol.

24. The apparatus of claim 22, wherein the first and second set of conductors carries data signals formatted according to the same data link protocol;

wherein the data signals carried by the first set of conductors relate to a first communication session; and wherein the data signals carried by the first set of conductors relate to a second communication session.

25. The apparatus of claim 22, further comprising a selector for selectively blocking the first or the second physical port.

26. A system for switching data signals formatted according to first data link protocol and for switching data signals formatted according to a second data link protocol, the apparatus being capable of receiving a plurality of physical cables, the apparatus comprising:

means for receiving the data signals of the first data link protocol and the signals of the second data link protocol over the same physical cable of the plurality of physical cables;

means for distinguishing between the data signals of the first data link protocol from the data signals of the second data link protocol;

means for processing the data signals detected to be of the first data link protocol;

means for processing the data signals detected to be of the second data link protocol;

a first computer network that communicates using the first data link protocol; and a second computer network that communicates using the second data link protocol, wherein the first and second computer networks are linked to the apparatus by the physical cable.

27. The system of claim 26, wherein the receiving means is a physical port comprising a first set of conductors for receiving the signals of the first data link protocol and a second set of conductors for receiving the signals of the second data link protocol.

28. The system of claim 26, wherein the means for processing the first data link protocol is an Ethernet switch circuit.

29. The system of claim 26, wherein the means for processing the second data link protocol is an IEEE 1394 switch circuit.

30. A system comprising:
 a first computer network comprising one or more computers communicating via a first communication protocol over a first set of conductors of a cable;
 a second computer network comprising one or more computers communicating via a second communication protocol over a second set of conductors of the cable; and
 a switch comprising a port for receiving the cable, the port comprising:
  a first set of conductors for passing signals of the first computer network in the first communication protocol, and a second set of conductors for passing signals of the second computer network in the second communication protocol.

31. The system of claim 30, wherein at least one of the computer networks comprises a bridge that enables the first and second computer networks to communicate with one another.

32. The system of claim 30, wherein switch comprises a bridge that enables the first and second computer networks to communicate with one another.

33. The system of claim 30, wherein the switch comprises a first switching unit for switching signals of the first communication protocol and a second switching unit for switching signals of the second communication protocol.

* * * * *